United States Patent
Terry et al.

(10) Patent No.: US 8,939,455 B1
(45) Date of Patent: Jan. 27, 2015

(54) RIDE-ON VEHICLE AND GAME SEAT FOR INFANTS AND YOUNG CHILDREN

(71) Applicants: Robert L. Terry, Houston, TX (US); M. Harris Milam, Houston, TX (US); George W. Batten, Jr., Houston, TX (US)

(72) Inventors: Robert L. Terry, Houston, TX (US); M. Harris Milam, Houston, TX (US); George W. Batten, Jr., Houston, TX (US)

( * ) Notice: Subject to any disclaimer, the term of this patent is extended or adjusted under 35 U.S.C. 154(b) by 0 days.

(21) Appl. No.: 14/248,156

(22) Filed: Apr. 8, 2014

Related U.S. Application Data

(60) Provisional application No. 61/814,238, filed on Apr. 20, 2013.

(51) Int. Cl.
| | |
|---|---|
| *B62B 7/00* | (2006.01) |
| *B62B 5/00* | (2006.01) |
| *B60N 2/28* | (2006.01) |
| *B62B 5/08* | (2006.01) |
| *B62B 9/00* | (2006.01) |

(52) U.S. Cl.
CPC ............ *B62B 5/0069* (2013.01); *B60N 2/2842* (2013.01); *B62B 5/004* (2013.01); *B62B 5/082* (2013.01); *B62B 9/00* (2013.01)
USPC ........................................ 280/87.051; 180/11

(58) Field of Classification Search
USPC .......... 180/19.1–19.3, 65.1–65.31, 54.1, 165; 280/33.991
See application file for complete search history.

(56) References Cited

U.S. PATENT DOCUMENTS 6,983,813 B1 * 1/2006 Wright ............................ 180/11
8,033,348 B1 * 10/2011 Parkhe ......................... 180/19.1

* cited by examiner

*Primary Examiner* — John Walters
*Assistant Examiner* — James Triggs

(57) ABSTRACT

This invention is a child's detachable-seat ride-on vehicle which can be used in an autonomous mode for infants, thereby providing soothing motion for the child, or, with a different detachable seat, a child-controlled ride-on vehicle for young children that are beyond the infant stage. For the latter, the vehicle can be driven by the child using finger control on a touch screen, or it can operate in an autonomous mode coordinated with displayed material, thereby providing enhanced game or educational experiences.

2 Claims, 2 Drawing Sheets

RIDE-ON VEHICLE AND GAME SEAT FOR INFANTS AND YOUNG CHILDREN

CROSS-REFERENCE TO RELATED APPLICATIONS

This application claims the benefit of U.S. provisional patent No. 61/814,238 filed on Apr. 20, 2013, which is herein incorporated by reference.

U.S. PATENT DOCUMENTS

U.S. Pat. No. 880,823 March 1908 Motor-vehicle.
U.S. Pat. No. 2,533,752 December 1950 Automobile vehicle.
U.S. Pat. No. 5,445,233 August 1995 Multi-directional motorized wheelchair.
U.S. Pat. No. 5,484,030 January 1996 Independently-powered bumper cart.
U.S. Pat. No. 5,743,347 April 1998 Electric powered small tractor.
U.S. Pat. No. 5,923,096 July 1999 All-electric vehicle control system.
U.S. Pat. No. 6,050,367 April 2000 Bi-directional vehicle.
U.S. Pat. No. 6,095,268 August 2000 Children's ride-on vehicle with independently driven and reversible wheels.
U.S. Pat. No. 6,581,703 June 2003 Omni direction vehicle.
61/739,696 December 2012 Children's ride-on vehicle with computer-tablet display and child supervision.
U.S. Pat. No. 6,983,813 January 2006 Remote controlled and motorized baby walker.

STATEMENT REGARDING FEDERALLY SPONSORED RESEARCH OR DEVELOPMENT

-Not applicable-

REFERENCE TO SEQUENCE LISTING, A TABLE, OR A COMPUTER PROGRAM LISTING COMPACT DISC APPENDIX

-Not applicable-

BACKGROUND AND BRIEF SUMMARY OF THE INVENTION

This invention relates generally to electrically-powered wheeled vehicles for children, but particularly to vehicles intended for use with infants and other young children. Related information appears in the provisional patent of application No. 61/739,696, which describes some of the mechanical, electrical, control, and communication aspects of the base vehicle. The present invention is an arrangement by which a basic vehicle can be adapted for either inducing calmness in infants by autonomously providing mild motion, possibly with an associated display; or for toddler entertainment as a touch-screen-controlled vehicle, or as a game seat with game display. In these applications, a computer tablet or smart phone is used for the display.

Many different baby carriages, baby walkers, and children's ride-on vehicles have been created and patented. The one described by Wright in referenced U.S. Pat. No. 6,983,813 has, like the present invention, powered wheels, an attachable seat for an infant, and wirelessly-connected remote control. Unlike the present invention, it has a single motor to power its wheels, and no other arrangement for steering. In the present invention, wheels on the left and right sides are driven by separate bidirectional motors, so the vehicle is steered by differentially rotating the two wheels. When driven by the motor, the invention of Wright moves only on a straight-line path, whereas the present invention can be controlled to move on complex curved paths.

Also, unlike the present invention, the invention of Wright does not have a means for conversion to a ride-on vehicle for older children (although it can be used as a walker for toddlers). The present invention provides for such a conversion by having an alternative seat for larger children and an arrangement by which a computer tablet or smart phone can be used for vehicle control by a child driver.

It is one of the purposes of this invention to provide a means of entertainment and education of young children. A computer tablet or smart phone provides enhancement in those directions. In particular, a computer tablet or smart phone normally used by other family members can be placed in temporary service to provide sounds and visual images to the child; and, for older children, to provide for vehicle control through the touch screen. When used this way, the computer tablet or smart phone is paired with the electronics system of the vehicle so that data can be passed between the two devices by computer communication.

Details of computer communication and other aspects of the overall computer arrangement are not described here as they are well known to persons skilled in the appropriate art. If appropriate computer software is installed in the computer tablet or smart phone, the device can present sounds, show videos, present interactive games, and even have the vehicle move in concordance with the display. For example, for an infant the vehicle might provide a rocking motion synchronized with music.

Some families will want a vehicle which can be used with an infant, then converted to one for use by a young child. An important feature of the present invention provides such a conversion. This might be particularly useful to a family that has both an infant and a young child. However, there are other families which will not need a vehicle for an infant, but which would like the vehicle to be as inexpensive a possible. Therefore, the invention includes a version for which seats are not interchangeable. Production cost for that version would be less than that of one with interchangeable seats, thereby making lower-cost retail sales possible.

BRIEF DESCRIPTION OF THE SEVERAL VIEWS OF THE DRAWINGS

FIG. 1A is an overview with all parts positioned as they would be in normal use. FIG. 1B shows the separable parts.

FIG. 2A is an overview with all parts positioned as they would be in normal use. FIG. 2B shows the separable parts, with the display mount rotated to a position for easy access by a child.

Figure 1B:
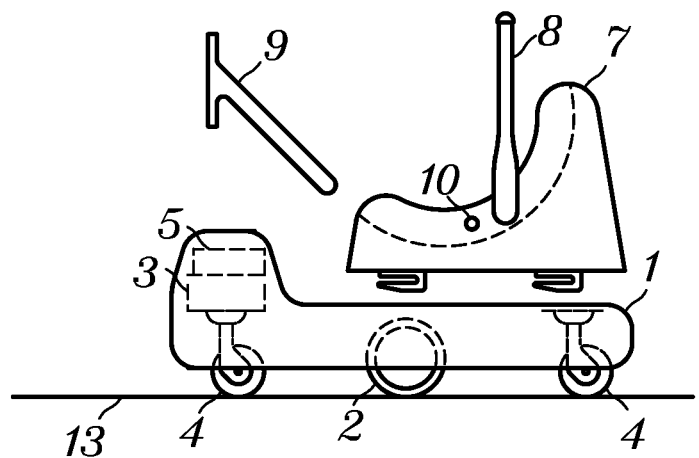
FIG. 1A and FIG. 1B show a schematic arrangement for use with an infant.

In both of these figures, a dashed line indicates the hidden surface of the seat.

DETAILED DESCRIPTION OF THE INVENTION

In the figures, the base vehicle comprises vehicle body 1; navigation wheels 2; electrical power source 3 (usually an electric battery); and electronics system 5, which provides various functions, including navigational features, motor control, and computer communication (especially that for linking to a display device). These items are described in more detail in provisional patent 61/739,696. The driving surface is indicated by 13.

Navigation wheels 2 comprise a left navigation wheel and a right navigation wheel, with collinear axes. The navigation wheels are driven by motors (not shown) which rotate the wheels independently in both directions. The electronics system controls electrical power to the motors. The figures are drawn as if the motors are in the hubs of the wheels. The navigation wheels 2 must always have good contact with the driving surface 13.

Motion of the vehicle depends on navigation-wheel rotations determined by motor-control signals produced by the electronics system. The vehicle operates in either an autonomous mode or a human-driver mode. In the former, the path of the vehicle is determined by a path description stored in the navigation feature of the electronics system. Several path descriptions can be stored, with only one used for a particular application. A parent or other child supervisor selects the particular path description using a linked computer tablet or smart phone, or by setting switches associated with the electronic system. Details of this are not provided here, but they would be apparent to persons skilled in the appropriate art.

The figures also show casters 4 which schematically represent features which limit the vehicle's pitch (vertical rotation about the axis-line of the navigation wheels).

Item 6 indicates, schematically, an arrangement for clamping a seat on the base vehicle. Alternative arrangements, such as one using straps, are possible.

Figure 1A:
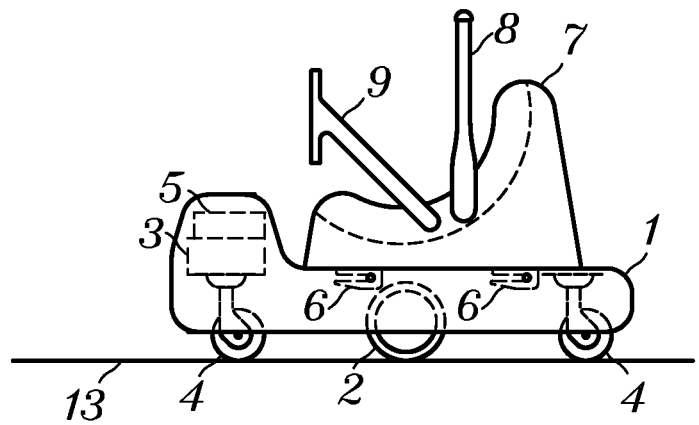

FIG. 1A shows an arrangement for use with an infant. The seat 7 with handle 8 is clamped to the base vehicle using 6, the clamping facility already mentioned. A removable display bracket 9 is for holding a computer tablet or smart phone to provide an entertaining display for the child. The vehicle can be stationary, or it can provide gentle motion to calm the child or encourage it to fall asleep. Such motion is under control of a parent or other guardian through a computer tablet or smart phone linked to the vehicle's electronics system 5, the linkage being wireless, for example, and well understood by persons skilled in the appropriate art. FIG. 1B shows separated parts, with attachment point 10 for the display bracket 9. The seat 7 can be separated from the base vehicle to be used, for example, to carry the child, or as an infant's car seat, with or without the display bracket 9.

Figure 2B:
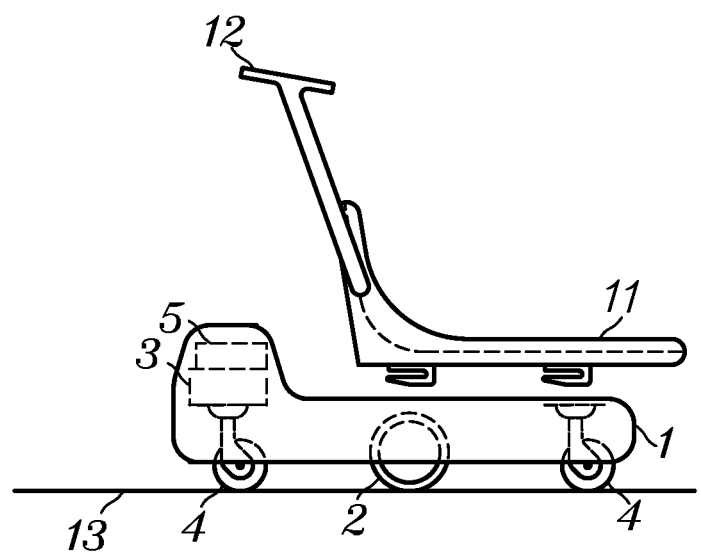
FIG. 2A and FIG. 2B show a schematic arrangement for use with a young child.
Figure 2A:
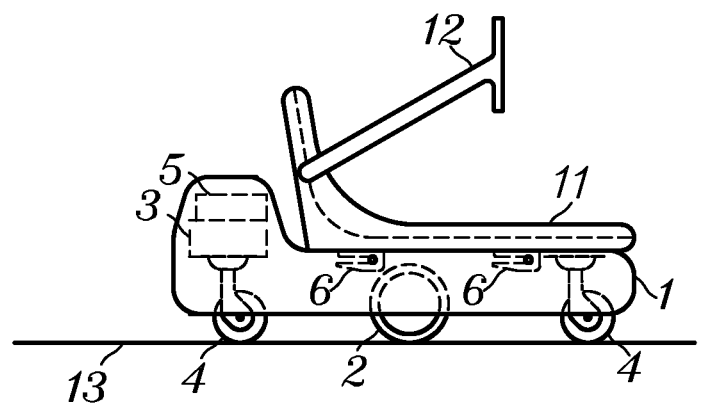

FIG. 2A shows an arrangement for use by a young child. The seat 11 is mounted using clamp arrangement 6 as with the seat 7 used for an infant, but the seat has been reversed to provide more room for the child's legs. Display bracket 12 holds a computer tablet or smart phone linked to the vehicle's electronics system 5. Computer software (often referred to as an "app") in the computer tablet or smart phone allows the child to drive the vehicle by finger control on the touch screen. The display bracket 12 swings up out of the way to allow the child to get onto the seat. This is shown in FIG. 2B, which also shows the seat separated from the base vehicle.

As with the arrangement for an infant, the computer tablet or smart phone used for the display can be programmed to show interactive games and other, possibly not interactive, content, and the corresponding apps can control vehicle motion so it is associated with the display. Methods for doing this are well known to persons skilled in the relevant art.

The arrangements of the display brackets 9 and 12 shown in the figures are schematic, and do not indicate exact arrangements.

It will be apparent to persons skilled in the relevant art that the battery 3 and electronics module 5 could be moved to positions underneath the seat, so the body hump over them could be eliminated. In that case it would not be necessary to reverse the seat for the toddler.

It will be apparent, also, that vehicle control could be done with a different human interface device, such as a joystick, rather than with a touch screen.

The invention claimed is:

1. A ride-on vehicle comprising:
a base vehicle having axially-aligned navigation wheels, a left-side navigation wheel and a right-side navigation wheel, each with a bidirectional drive motor;
an electronic system for navigation, motor control, and computer communication, said electronic system including a battery supplying all necessary electrical power;
an arrangement for fastening a seat on the base vehicle;
a pair of interchangeable seats, one for an infant and one for an older child, each of said seats detachably mounting on the base vehicle; and
for each of said seats, a bracket to hold a computer tablet or smart phone in view of the child, said bracket mounting on the seat; with
the said electronics system providing controlled electric signals to the said motors, said signals determining the rotational speed and rotational direction of the navigation wheels, each navigation wheel's rotational speed and rotational position being variable in both directions independently of the other navigation wheel; with
the said computer communication providing data transfer in both directions between the said electronic system and a computer tablet or smart phone when said computer tablet or smart phone is paired for communication with the electronic system; with
the navigation arrangement of the said electronic system having one or more stored path descriptions; with
the said electronic system having an arrangement by which a single path description is selected; and with
the said selected path description being used for generating signals to said motors so the navigation wheels rotate to drive the vehicle along the physical path corresponding to the path description.

2. A ride-on vehicle as in claim 1, except that
the vehicle does not have an arrangement for fastening a removable seat;
the vehicle has a single seat that cannot be removed; and
the vehicle has a bracket for holding a computer tablet or smart phone in view of the child, said bracket mounting on the vehicle.

\* \* \* \* \*